(12) United States Patent
Lance et al.

(10) Patent No.: US 6,460,744 B2
(45) Date of Patent: Oct. 8, 2002

(54) STORAGE UNIT SLIDABLY MOUNTED TO VEHICLE

(76) Inventors: Marshall Lance, 523 N. First Street, Geneva, IL (US) 60134; Sandra Lance, 1088 Center Dr., South Elgin, IL (US) 60177

( * ) Notice: Subject to any disclaimer, the term of this patent is extended or adjusted under 35 U.S.C. 154(b) by 26 days.

(21) Appl. No.: 09/799,255

(22) Filed: Mar. 5, 2001

(65) Prior Publication Data

US 2002/0014505 A1 Feb. 7, 2002

Related U.S. Application Data

(63) Continuation-in-part of application No. 09/621,770, filed on Jul. 21, 2000, now Pat. No. 6,375,054.

(51) Int. Cl.$^7$ ................................................. B60R 7/00
(52) U.S. Cl. ........................ 224/404; 224/547; 224/557; 296/37.6
(58) Field of Search ................................ 224/404, 403, 224/547, 557; 296/37.6

(56) References Cited

U.S. PATENT DOCUMENTS

| | | | |
|---|---|---|---|
| 3,826,529 A | | 7/1974 | Wood |
| 4,085,961 A | | 4/1978 | Brown |
| 4,249,684 A | * | 2/1981 | Miller et al. .................. 109/51 |
| 4,469,364 A | | 9/1984 | Rafi-Zadeh |
| 4,573,731 A | | 3/1986 | Knaack et al. |
| 4,728,017 A | * | 3/1988 | Mullican ..................... 224/328 |
| 4,752,095 A | * | 6/1988 | Brady ......................... 224/310 |
| 4,789,195 A | | 12/1988 | Fletcher |
| 4,889,377 A | | 12/1989 | Hughes |
| D305,315 S | | 1/1990 | Fletcher |
| 4,898,284 A | | 2/1990 | Arens |
| 4,971,234 A | | 11/1990 | Hay |
| 5,015,025 A | | 5/1991 | Henriquez |
| 5,076,630 A | | 12/1991 | Henriquez |
| 5,088,636 A | * | 2/1992 | Barajas ....................... 224/281 |
| 5,121,306 A | | 6/1992 | Palmisano |
| 5,232,259 A | | 8/1993 | Booker |
| 5,395,019 A | | 3/1995 | Christensen |
| 5,398,987 A | | 3/1995 | Sturgis |
| 5,588,631 A | * | 12/1996 | Yee .............................. 211/4 |
| 5,743,584 A | | 4/1998 | Lance et al. |
| 5,779,047 A | | 7/1998 | Darrah |
| 5,964,492 A | | 10/1999 | Lyon |
| 5,988,473 A | * | 11/1999 | Hagan et al. ............... 224/404 |

OTHER PUBLICATIONS

Snap–On Tools Catalog, 1982, 298 pages, date unknown.
Hand–numbered documents 1–44, date unknown.
Hand–numbered documents 47–72, date unknown.
Hand–numbered documents 101–140, date unknown.

* cited by examiner

*Primary Examiner*—Stephen K. Cronin
(74) *Attorney, Agent, or Firm*—Marshall, Gerstein & Borun

(57) ABSTRACT

A storage unit adapted to be slidably coupled to a rear floor portion of a vehicle, such as a pickup truck, may be provided with a mounting structure and a cabinet slidably coupled to the mounting structure. The storage unit may be provided with a plurality of drawers disposed in the cabinet and positioned within the cabinet between a pair of cabinet sidewalls, each of the drawers being movable in a direction parallel to the width of the cabinet. The storage unit may have a cover operatively connected to the cabinet, the cover being movable between an open position in which the drawers may be opened and a closed position in which the cover prevents the drawers from being opened, and a cover latch associated with the cover that allows the cover to be latched in its closed position.

22 Claims, 12 Drawing Sheets

STORAGE UNIT SLIDABLY MOUNTED TO VEHICLE

This is a continuation-in-part of U.S. Ser. No. 09/621,770, entitled "Vehicle Mounted Storage Unit" and filed in the Patent Office on Jul. 21, 2000 now U.S. Pat. No. 6,375,054.

BACKGROUND OF THE INVENTION

The present invention is directed to a vehicle mounted storage unit.

U.S. Pat. No. 5,121,306 to Palmisano discloses a tool compartment mounted to the rear floor portion of a pickup truck. The tool compartment is mounted to the floor portion of the pickup truck at a mounting position disposed just behind and adjacent to the cab of the pickup truck. The tool compartment is shown to have a length that is substantially the same as the distance between the two sidewalls of the pickup truck so that the tool compartment extends the entire distance between the two sidewalls of the pickup truck.

U.S. Pat. No. 5,232,259 to Booker discloses a toolbox mounted to a rear floor portion of a pickup truck at a mounting point adjacent the tailgate of the pickup truck. The side of the toolbox disposed adjacent the tailgate has a relatively large height and the opposite side of the toolbox has a relatively small height, and the top side of the toolbox is angled so that it increases in height towards the tailgate and so that the top side of the tailgate acts as an air deflector.

U.S. Pat. No. 5,964,492 to Lyon discloses a storage receptacle for a pickup truck bed. The storage receptacle is shaped like a box and slidably mounted to the rear portion of the pickup truck. The storage receptacle is provided with a hinged cover that has a first portion that is generally horizontal when the cover is in a closed position and a second portion that is generally vertical when the cover is in an open position. The cover is supported in its open position by a counterweighting air cylinder attached between a sidewall of the storage receptacle and the cover.

SUMMARY OF THE INVENTION

The present invention is directed to a storage structure adapted to be mounted to a rear floor portion of a vehicle having a rearwardly facing cab wall, a first vehicle sidewall, a first wheel well having a portion which extends outwardly from a portion of the first vehicle sidewall, a second vehicle sidewall, a second wheel well having a portion which extends outwardly from a portion of the second vehicle sidewall, and a rear door.

The storage structure may include a mounting structure capable of being mounted to the rear floor portion of the vehicle. The mounting structure may have a first guide structure capable of being mounted to the rear floor portion of the vehicle, a second guide structure capable of being mounted to the rear floor portion of the vehicle, and a cabinet capable of being slidably coupled to the mounting structure.

The mounting structure may allow the cabinet to slide between a first position in which the cabinet is disposed adjacent the rearwardly facing cab wall and a second position in which the cabinet is disposed adjacent the rear door of the vehicle when the mounting structure is mounted to the vehicle and when the cabinet is slidably coupled to the mounting structure.

The cabinet may be provided with a first cabinet sidewall spaced from the first vehicle sidewall by at least about four inches in a direction perpendicular to the first cabinet sidewall when the mounting structure is mounted to the vehicle and when the cabinet is mounted to the mounting structure and a second cabinet sidewall spaced from the first cabinet sidewall in a direction parallel to the length of cabinet. The second cabinet sidewall may be spaced from the second vehicle sidewall by at least about four inches in a direction perpendicular to the second cabinet sidewall when the mounting structure is mounted to the vehicle and when the cabinet is mounted to the mounting structure.

In another aspect, the invention is directed to a storage structure adapted to be mounted to a rear floor portion of a vehicle having a rearwardly facing cab wall, a first vehicle sidewall, a first wheel well having a portion which extends outwardly from a portion of the first vehicle sidewall, a second vehicle sidewall, a second wheel well having a portion which extends outwardly from a portion of the second vehicle sidewall, and a rear door.

The storage structure may include a mounting structure capable of being mounted to the rear floor portion of the vehicle and a cabinet capable of being slidably coupled to the mounting structure. The mounting structure may allow the cabinet to slide between a first position in which the cabinet is disposed adjacent the rearwardly facing cab wall and a second position in which the cabinet is disposed adjacent the rear door of the vehicle when the mounting structure is mounted to the vehicle and when the cabinet is coupled to the mounting structure. The mounting structure may be designed to allow the cabinet to be removed from the mounting structure when the mounting structure is mounted to the vehicle.

The mounting structure may have a plurality of slots, the cabinet may have a plurality of wheels, and the cabinet may be removed from the mounting structure by aligning the slots in the mounting structure with the wheels and then lifting the cabinet.

The features and advantages of the present invention will be apparent to those of ordinary skill in the art in view of the detailed description of the preferred embodiment, which is made with reference to the drawings, a brief description of which is provided below.

DETAILED DESCRIPTION OF VARIOUS EMBODIMENTS

Figure 1:
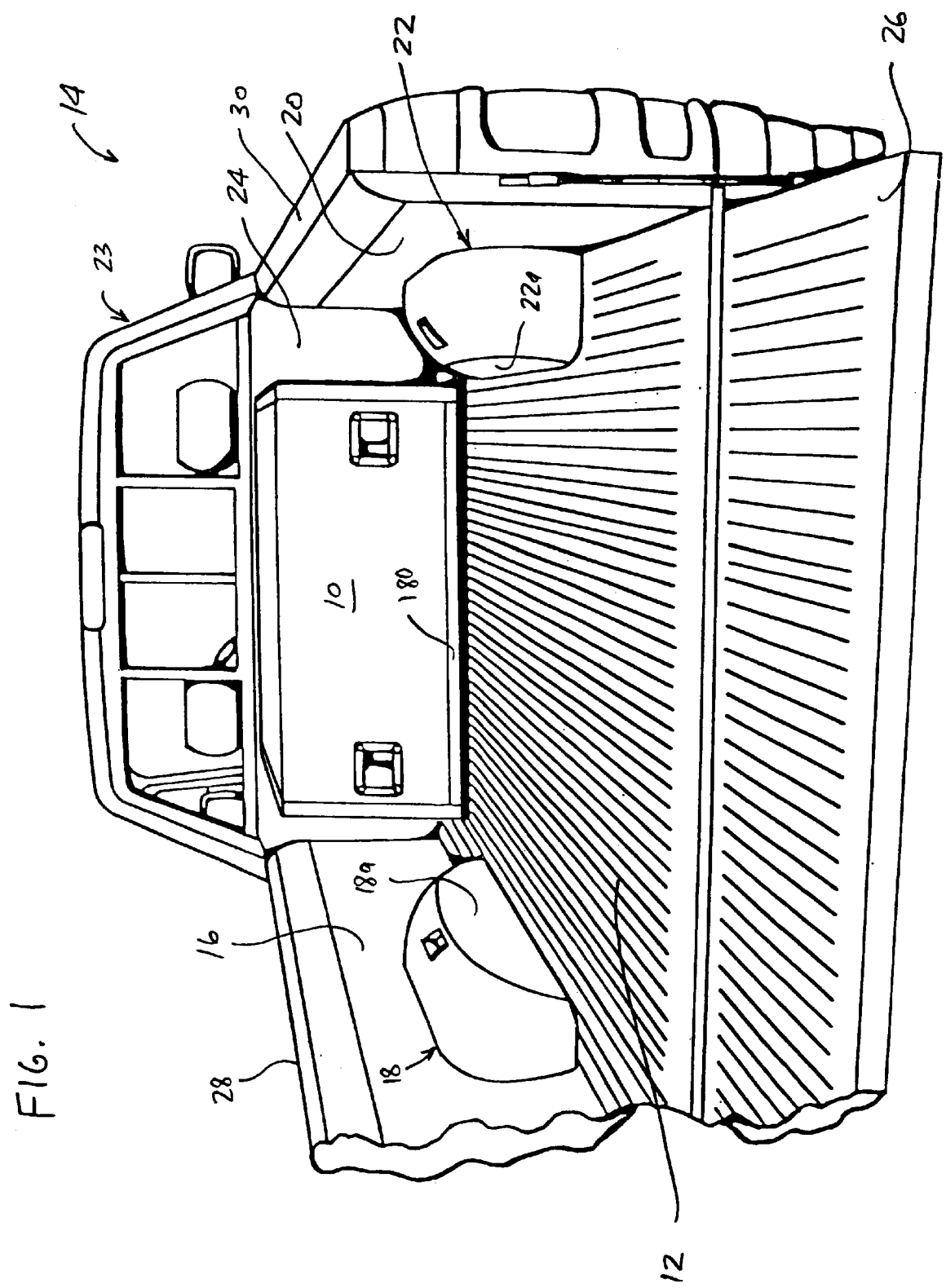
FIG. 1 is a perspective view of a first embodiment of a storage unit in accordance with the invention mounted to the rear bed of a pickup truck.

FIG. 1 illustrates one embodiment of a storage unit 10 in accordance with the invention shown mounted to the rear floor portion or bed 12 of a pickup truck 14. The pickup truck 14 is provided with a left sidewall 16, a left wheel well 18 that extends outwardly from the left sidewall 16, a right sidewall 20, and a right wheel well 22 that extends outwardly from the right sidewall 20. The pickup truck 14 is also provided with a cab 23 for the driver and one or more passengers, a rearwardly facing cab wall 24, and a tailgate 26 that is pivotally connected to the rear end of the truck bed 12. The sidewalls 16, 20 have respective top portions or surfaces 28, 30. While the following description is made with reference to a pickup truck 14, the storage unit 10 could be mounted to other vehicles, such as vans that have internal wheel wells like those shown in FIG. 1.

The storage unit 10 may be provided with a length of between about three feet and about four feet, a width of between about twelve inches and about thirty inches, and a height of between about fifteen inches and about twenty four inches. The height of the storage unit 10 may be made no greater than about twenty inches, which is the approximate distance that the sidewalls 16, 20 extend above the bed 12 of the pickup truck 14.

The distance between the interior faces of the two vehicle sidewalls 16, 20, taken in a direction perpendicular to the sidewalls 16, 20, may range from about 50 inches to about 70 inches, and the distance between a pair of interior portions or faces 18a, 22a of the wheel wells 18, 22 taken in that same direction (i.e. the wheel-well-to-wheel-well distance) may range from about 40 inches to about 50 inches. The storage unit 10 may be provided with a length that is no greater than the wheel-well-to-wheel-well distance.

FIG. 1 shows the storage unit 10 mounted immediately adjacent the rear cab wall 24 of the pickup truck 14 so that the storage unit 10 is disposed equidistant between the left and right vehicle sidewalls 16, 20 and so that the length of the storage unit 10 is disposed in a direction parallel to the rear cab wall 24 and perpendicular to a pair of planes coinciding with the sidewalls 16, 20. When the storage unit 10 is so mounted, due to the length of the storage unit 10 being less than the sidewall-to-sidewall distance noted above, there may be a space or gap of between about four inches to about ten inches between each of the sidewalls and a respective one of the sides of the storage unit 10.

Figure 2:
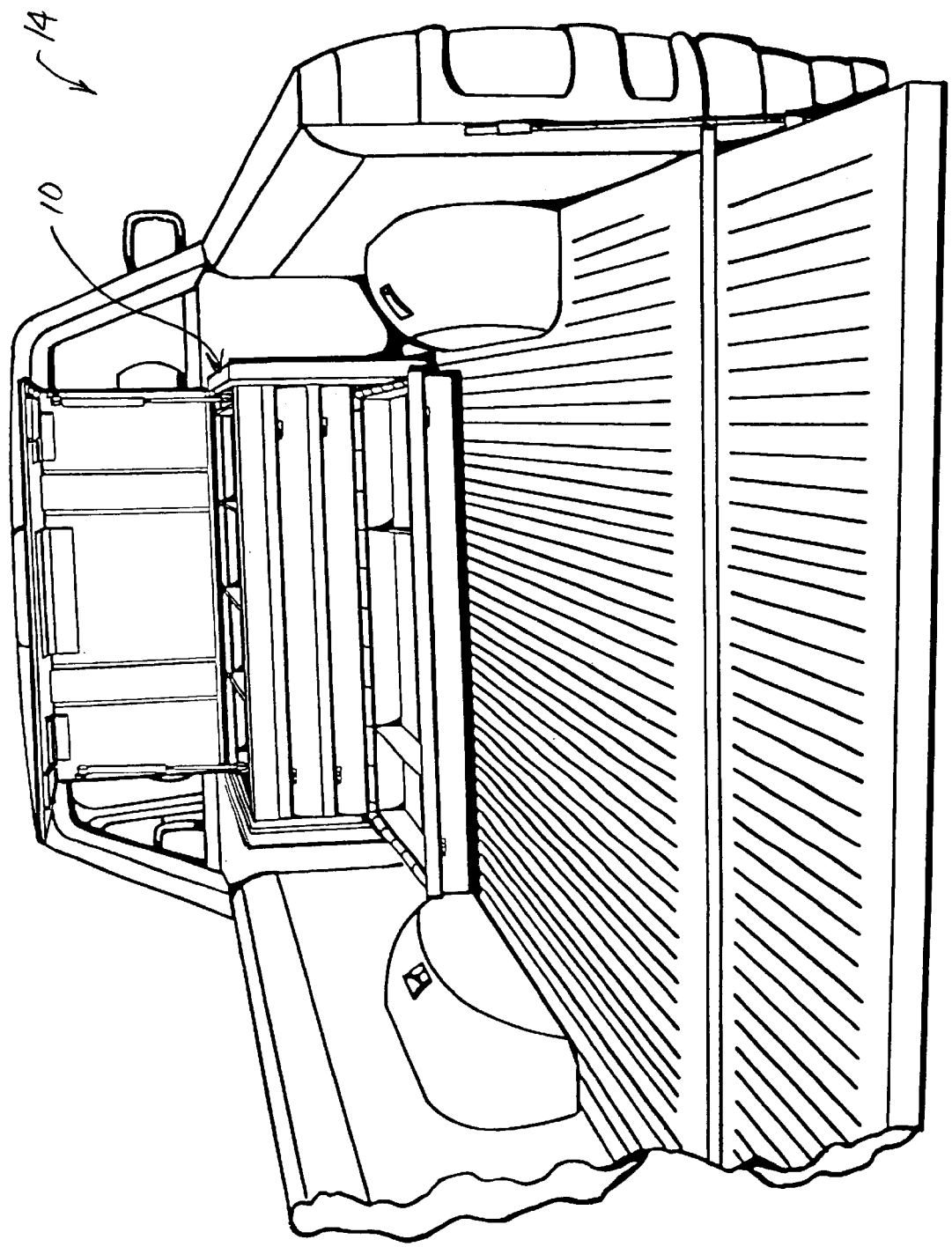
FIG. 2 illustrates the storage unit of FIG. 1 with its cover and one of its drawers open.
Figure 3:
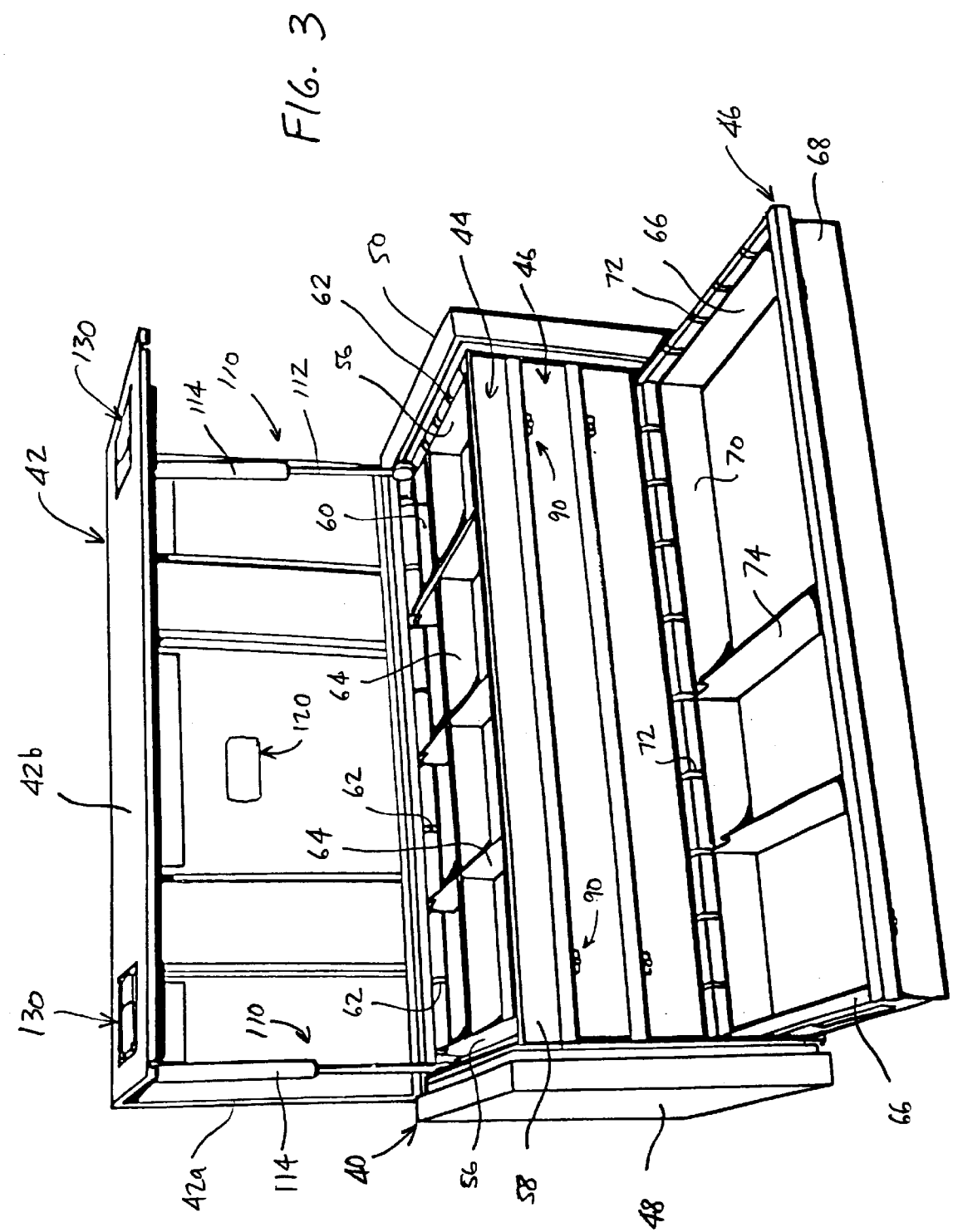
FIG. 3 is a perspective view of the storage unit of FIG. 1 with its cover open and one of its drawers open.

Referring to FIGS. 2 and 3, the storage unit 10 may be provided with a box-shaped cabinet 40, a cover 42 pivotally connected to the cabinet 40, a fixed top tray 44, and a plurality of slidable drawers 46. The cabinet 40 may be provided with a first sidewall 48, a second sidewall 50, a rear cabinet member 52 (FIG. 6), such as a flat wall portion, and a cabinet floor member 54 (FIG. 6), such as a flat base portion. The cabinet 40, the cover 42 and other parts of the storage unit 10 may be composed of steel, and the cabinet 40 and the cover 42 may be provided with a patterned surface having diamond-shaped raised areas for strength and/or durability.

Referring to FIG. 3, the top tray 44 may be provided with a pair of tray sidewalls 56 spaced apart by a distance ranging from about 30 inches to about 48 inches. The top tray 44 may be provided with a front wall 58 and a rear wall 60. The tray walls 56, 58, 60 may have a plurality of spaced-apart slots 62 formed therein, with each of the slots 62 sized to receive one end of a tray divider 64. The tray dividers 64 may have slots (not shown) formed therein to facilitate division of the top tray 44 into various sized rectangular storage areas via tray dividers 64 oriented in a direction parallel to the length of the cabinet 40 and tray dividers 64 oriented in a direction perpendicular to the length of the cabinet 40.

Each of the drawers 46 may be provided with a pair of drawer sidewalls 66 spaced apart by a distance ranging from about 30 inches to about 48 inches. Each drawer 46 may be provided with a front wall 68 and a rear wall 70. The drawer walls 66, 68, 70 may have a plurality of spaced-apart slots 72 formed therein, with each of the slots 72 sized to receive one end of a drawer divider 74. The drawer dividers 74 may have slots (not shown) formed therein to facilitate division of each drawer 46 into various sized rectangular storage areas via drawer dividers 74 oriented in a direction parallel to the length of the cabinet 40 and drawer dividers 74 oriented in a direction perpendicular to the length of the cabinet 40.

Figure 7:
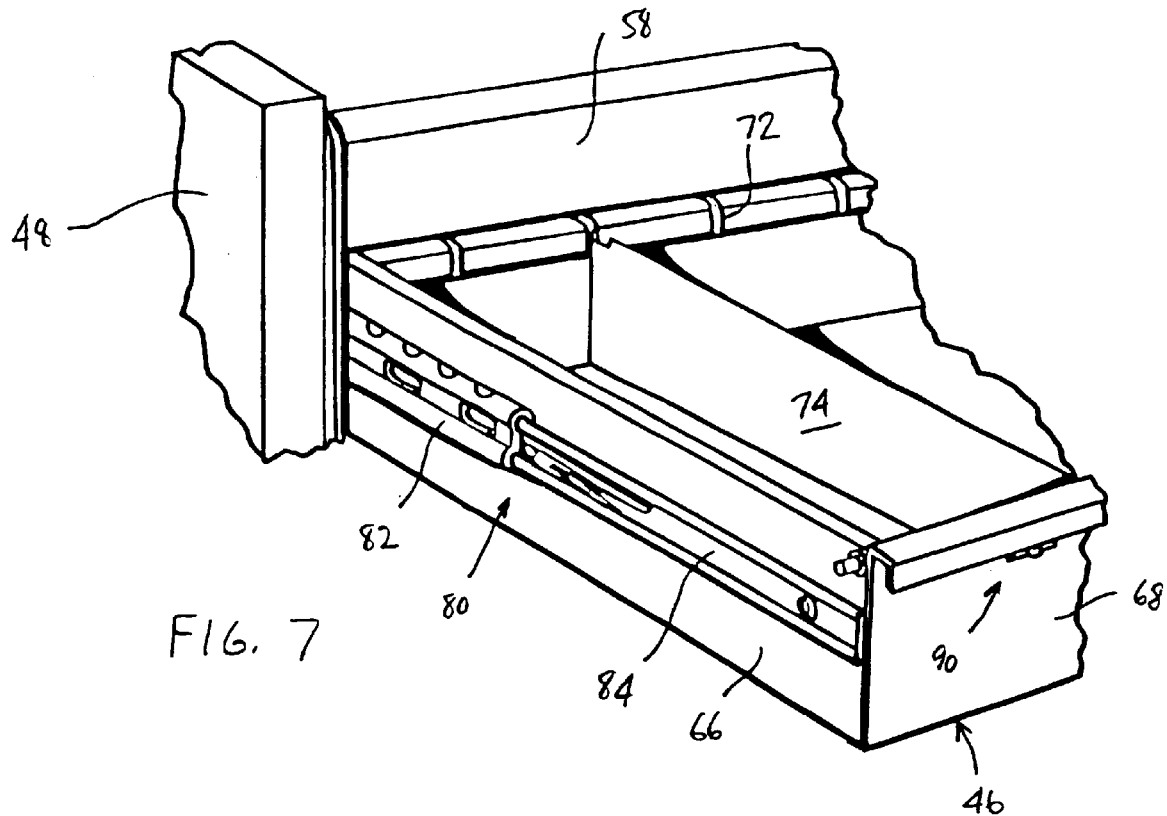
FIG. 7 is a perspective view of a portion of one of the drawers of the storage unit.
Figure 8:
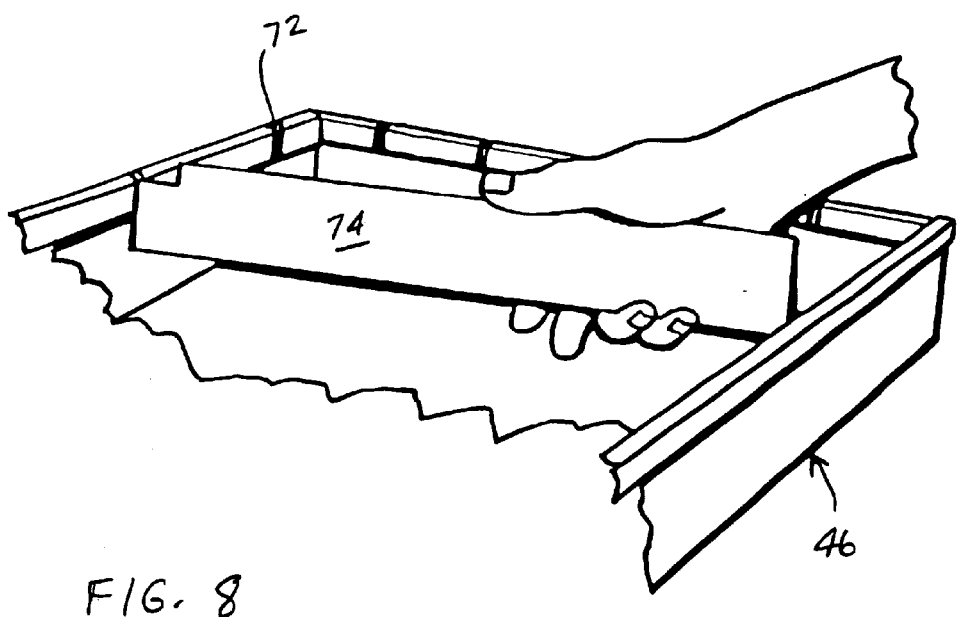
FIG. 8 is a perspective view of a portion of one of the drawers of the storage unit illustrating the insertion of a drawer divider.

Referring to FIG. 7, each of the drawers 46 may be provided with a pair of conventional drawer support assemblies 80 that slidably support the drawer 46 between a closed position in which the drawer 46 is disposed within the cabinet 40 and an open position in which the drawer 46 extends outwardly from the cabinet 40. Each drawer support assembly 80 may be composed of an outer support member 82 slidably connected to the cabinet 40 and an inner support member 84 that is fixed to one side of the drawer 46 and slidably retractable into the outer support member 82. The drawers 46 may be provided with conventional drawer stop structures that prevent the drawers 46 from being pulled outwardly by more than a predetermined extent.

Figure 9:
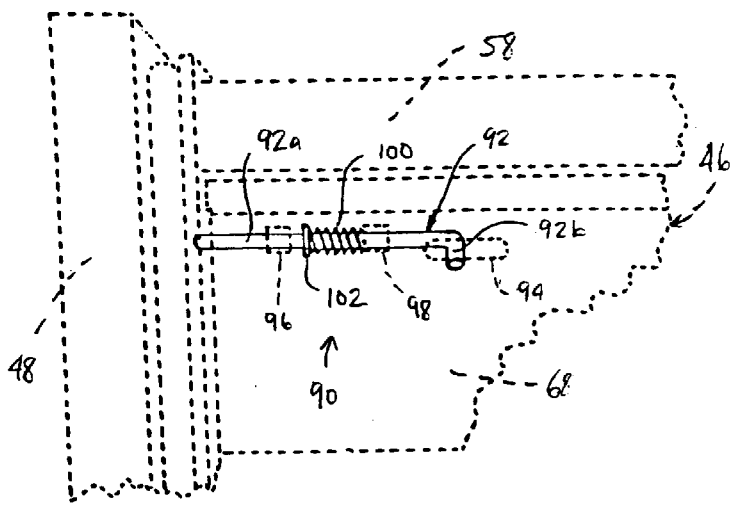
FIG. 9 illustrates an embodiment of a drawer latch that can be used to secure a drawer in its closed position.

Referring to FIGS. 3 and 9, each of the drawers 46 may be provided with one or more latch assemblies 90 to maintain the the drawers 46 in a secured position when the pickup truck 14 is in motion. One of the latch assemblies 90 may be operatively connected to each end of each of the drawers 46. FIG. 9 shows an embodiment of one of the latch assemblies 90 to include an L-shaped latch rod 92 having a long portion 92a and a short portion 92b that extends through a slot 94 formed in the front face of the drawer 46 (shown in phantom). The latch rod 92 may be translatably journalled by a pair of support members 96, 98, each of which has a hole (not shown) through which the rod 92 passes. The rod 92 may pass through a spring 100, and a stop member 102 having a diameter or width larger than that of the spring 100 may be fixed to the rod 92. The diameter of the spring 100 may be larger than the hole (not shown) in the support member 98 through which the rod 92 passes so that the spring 100 is trapped or captured between the stop member 102 and the support member 98.

In the position shown in FIG. 9, the spring 100 exerts a spring force against both the support member 98 and the stop member 102 to force the rod 92 to the left, which causes the end 92c of the rod portion 92a to be disposed in a hole 104 (FIG. 10) formed in an interior wall 106 of the cabinet 40. When the rod 92 in that position, the drawer 46 may not be opened.

When the short portion 92b of the rod 92 is grasped and forced to travel to the right within the slot 94, the end 92c of the rod portion 92a will be moved out of the hole 104 in the interior wall 106, and the drawer 46 may be opened. When the rod 92 is released with the drawer 46 in its open position, the spring 100 will force the rod 92 back to its position shown in FIG. 9.

Figure 10:
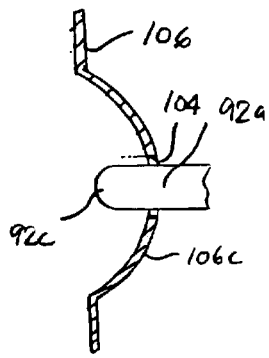
FIG. 10 is a top view of a portion of the storage unit shown partly in cross section.

Referring to FIG. 10, the interior wall 106 of the cabinet 40 may be provided with an angled or curved portion 106a, and the rod 92 may be provided with a rounded end 92c, so that the user does not have to manually move the latch rod 92 in order to close the drawer 46. In that case, when the drawer 46 is closed, the angled or curved portion 106a will automatically cause the rod 92 to be pushed to the right against the force of the spring 100. Then, when the end 92c of the rod 92 becomes aligned with the hole 104, the spring 100 will force the end 92c of the rod 92 to move into the hole 104 to prevent the drawer 46 from being opened again.

Figure 12:
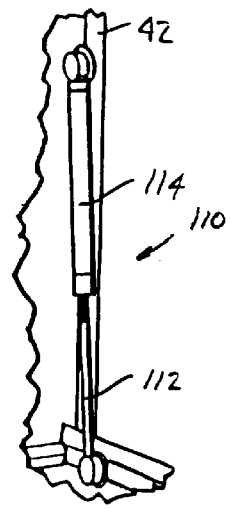
FIG. 12 illustrates an actuator that facilitates opening of the cover of the storage unit.

As shown in FIG. 3, the cover 42 may be provided as an L-shaped member having a top cover portion 42a and a front cover portion 42b disposed perpendicular to the top cover portion 42a. Referring to FIGS. 3 and 12, opening and closing the cover 42 may be assisted by one or more support assemblies 110, which may be provided as gas-filled shock absorbers having a piston rod 112 having an attached piston (not shown) slidingly disposed in a gas-filled cylinder 114. The support assemblies 110 may be mounted so that closing of the cover 42 causes the pistons to compress the gas within the cylinder 114, and so that the opening of the cover 42 is assisted by decompression of the gas, thus effectively reducing the perceived weight of the cover 42 upon its being opened and closed. The support assemblies 110 may also be designed to support the cover 42 in its open position as shown in FIG. 3.

Figure 14:
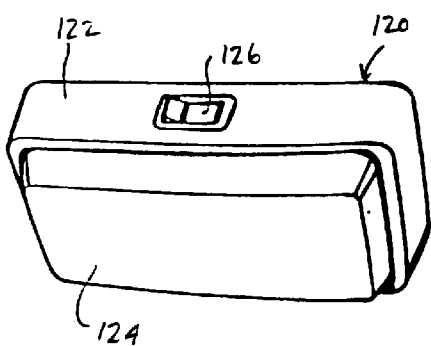
FIG. 14 illustrates a lamp that may be mounted to the underside of the cover of the storage unit for illuminating the interior of the storage unit.

Referring to FIGS. 3 and 14, a battery-operated lamp assembly 120 may be mounted to the underside of the top cover portion 42a. As shown in FIG. 14, the lamp assembly 120 may include a lamp housing 122 in which a light bulb (not shown) and one or more batteries (not shown) are disposed, a clear or translucent globe 124 that allows light to pass through, and a switch 126 for turning the light bulb on and off.

Figure 13:
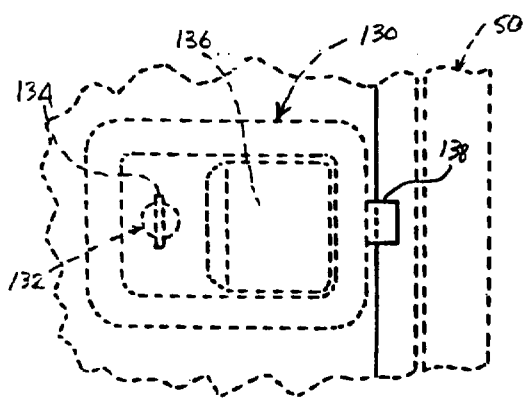
FIG. 13 illustrates a cover latch that may be used to latch the cover of the storage unit in its closed position.

Referring to FIGS. 3 and 13, the front cover portion 42b may have one or more opening latches 130 formed therein. Referring to FIG. 13, an embodiment of one of the latches 130 may be provided with a locking mechanism 132 with a keyhole 134, a pivotable handle 136, and a latch member 138. Locking the latch 130 via the keyhole 134 may prevent the handle 136 from pivoting when it is pulled outwardly. With the latch 130 unlocked, pulling the handle 136 outwardly may cause the latch member 138 to retract (move to the right in FIG. 13) or be removed from a slot (not shown) formed in a portion of the cabinet sidewall 50 to allow the cover 42 to be opened.

Figure 4:
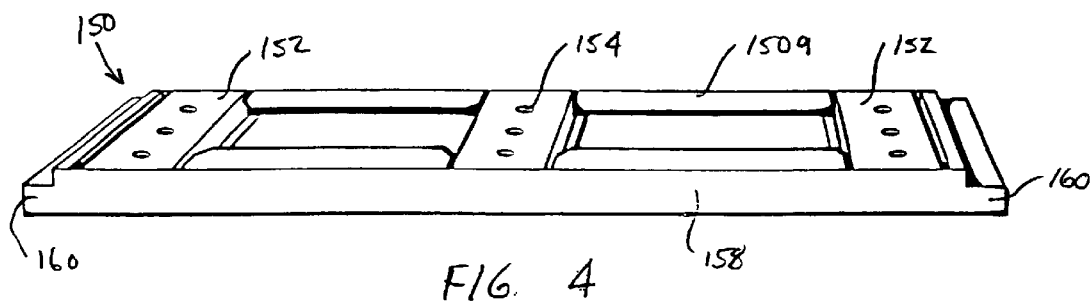
FIG. 4 is a perspective view of a structure for mounting the storage unit to the pickup truck with the bottom side of the mounting structure facing upwards.
Figure 5:
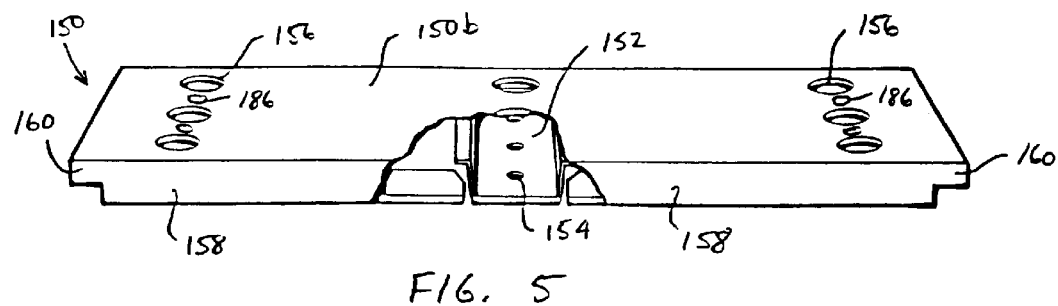
FIG. 5 is a perspective view of the mounting structure of FIG. 4 with the top side of the mounting structure facing upwards.

FIGS. 4 and 5 illustrate a mounting structure or bracket 150 that may be used to facilitate mounting of the cabinet 40 to the bed 12 of the pickup truck 14. Referring to FIGS. 4 and 5, the mounting bracket 150 has a bottom side 150a having three panel portions 152 each of which has three relatively small-diameter holes 154 formed therein. The mounting bracket 150 has a top side 150b having three rows of three relatively large-diameter holes 156 formed therein. The mounting bracket 150 has a central body portion 158 and a pair of flanges 160 each of which extends outwardly from a respective side of the central body portion 158 and each of which is vertically spaced from the bed 12 of the pickup truck 14 by a distance to define a first flange space when the mounting bracket 150 is mounted to the bed 12 with its top surface 150b facing upwards.

Figure 6:
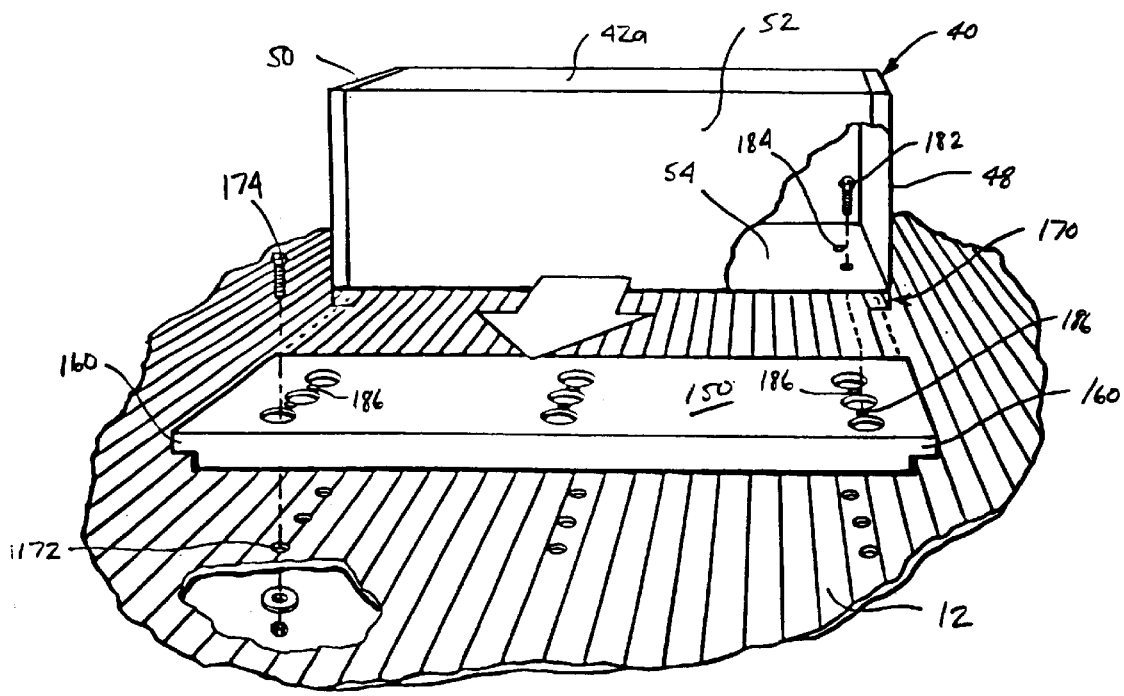
FIG. 6 is an exploded perspective view illustrating how the storage unit may be mounted to the bed of the pickup truck.
Figure 11:
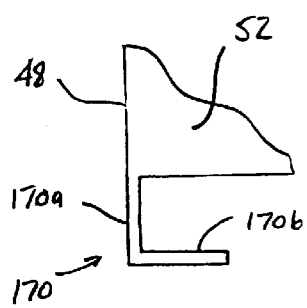
FIG. 11 illustrates one of the flange members of the cabinet of the storage unit.

Referring to FIGS. 6 and 11, each lower side of the cabinet 40 may be provided with a respective mounting flange 170 that extends the entire width of the cabinet 40. As shown in FIG. 11, each mounting flange 170 may have a vertical flange portion 170a generally coincident with one of the sidewalls 48, 50 of the cabinet 40 and a horizontal flange portion 170b. The horizontal portion 170b of each of the flanges 170 attached to the cabinet 40 may be sized to fit within a respective one of the flange spaces formed between the flanges 160 of the mounting bracket 160 and the bed 12 when the bracket 150 is mounted to the bed 12.

Referring to FIG. 6, which shows the rear of the cabinet 40 viewed from the pickup truck cab 23, the storage unit 10 may be mounted to the pickup truck bed 12 by first drilling a plurality of holes 172 in the pickup truck bed 12, then by fastening the mounting bracket 150 to the bed 12 with a plurality of bolts 174 that pass through the holes 154 in the mounting bracket 150 and the holes 172 in the bed 12.

With the mounting bracket 150 so mounted, the cabinet 40 may be slid onto the mounting bracket 150, with the rear wall 52 of the cabinet 40 facing the cab 23, so that the flange portions 170b connected to the lower sides of the cabinet 40 are positioned in the flange spaces between the flanges 160 of the mounting bracket 150 and the bed 12. The cabinet 40 may be slid relative to the mounting bracket 150 until either a lower front portion 180 (FIG. 1) of the cabinet 40 makes contact with the mounting bracket 150 or until the cabinet 40 makes contact with the cab wall 24 (FIG. 1).

With the cabinet 40 disposed in the desired position, the cabinet 40 may be connected to the mounting bracket 150 via a plurality of bolts 182 that pass through a plurality of holes 184 formed in the floor portion 54 of the cabinet 40 and through a plurality of holes 186 formed in the mounting bracket 150, the holes 186 being of relatively small diameter and being positioned between the large-diameter holes 156.

Slidable Storage Unit Embodiments

Figure 15:
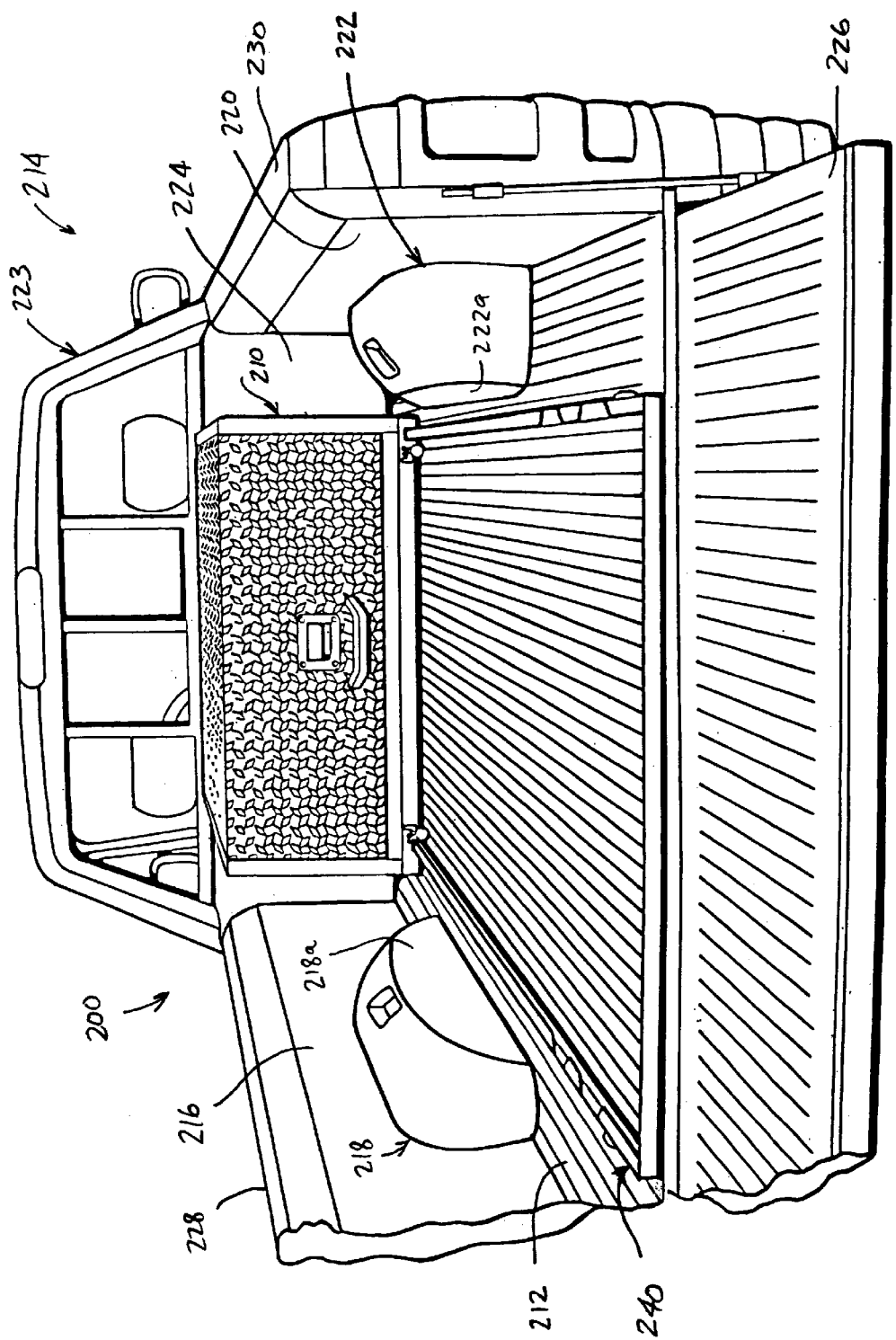
FIG. 15 is a perspective view of an embodiment of a storage structure in accordance with the invention mounted to the rear bed of a pickup truck and shown in a first position.

FIG. 15 illustrates another embodiment of a storage structure 200 in accordance with the invention. The storage structure 200 may include a storage unit 210 slidably mounted to the rear floor portion or bed 212 of a pickup truck 214. As used herein, the terms "slidable" and "slidably" are intended to refer to, without limitation, structures that are rollable or movable, including structures that have rollers or other devices to facilitate such movement.

The pickup truck 214 may have a left sidewall 216, a left wheel well 218 that extends outwardly from the left sidewall 216, a right sidewall 220, and a right wheel well 222 that extends outwardly from the right sidewall 220. The pickup truck 214 may also have a cab 223 for the driver and one or more passengers, a rearwardly facing cab wall 224, and a tailgate 226 that is pivotally connected to the rear end of the truck bed 212. The sidewalls 216, 220 may have respective top portions or surfaces 228, 230. While the following description is made with reference to a pickup truck 214, the storage unit 210 could be mounted to other vehicles, such as vans that have internal wheel wells like those shown in FIG. 15.

The storage unit 210 may be provided with a length of between about three feet and about four feet, a width of between about twelve inches and about thirty inches, and a height of between about fifteen inches and about twenty four inches. The height of the storage unit 210 may be made no greater than about twenty inches, which is the approximate distance that the sidewalls 216, 220 extend above the bed 212 of the pickup truck 214.

The distance between the interior faces of the two vehicle sidewalls 216, 220, taken in a direction perpendicular to the sidewalls 216, 220, may range from about 50 inches to about 70 inches, and the distance between a pair of interior portions or faces 218a, 222a of the wheel wells 218, 222 taken in that same direction (i.e. the wheel-well-to-wheel-well distance) may range from about 40 inches to about 50 inches. The storage unit 210 may be provided with a length that is no greater than the wheel-well-to-wheel-well distance.

FIG. 15 shows the storage unit 210 disposed adjacent the rear cab wall 224 of the pickup truck 214 so that the storage unit 210 is disposed equidistant between the left and right vehicle sidewalls 216, 220 and so that the length of the storage unit 210 is disposed in a direction parallel to the rear cab wall 224 and perpendicular to a pair of planes coinciding with the sidewalls 216, 220. When the storage unit 210 is so positioned, due to the length of the storage unit 210 being less than the sidewall-to-sidewall distance noted above, there may be a space or gap of between about four inches to about ten inches between each of the sidewalls 216, 220 and a respective one of the sides of the storage unit 210.

The Mounting Structure 240

Figure 17:
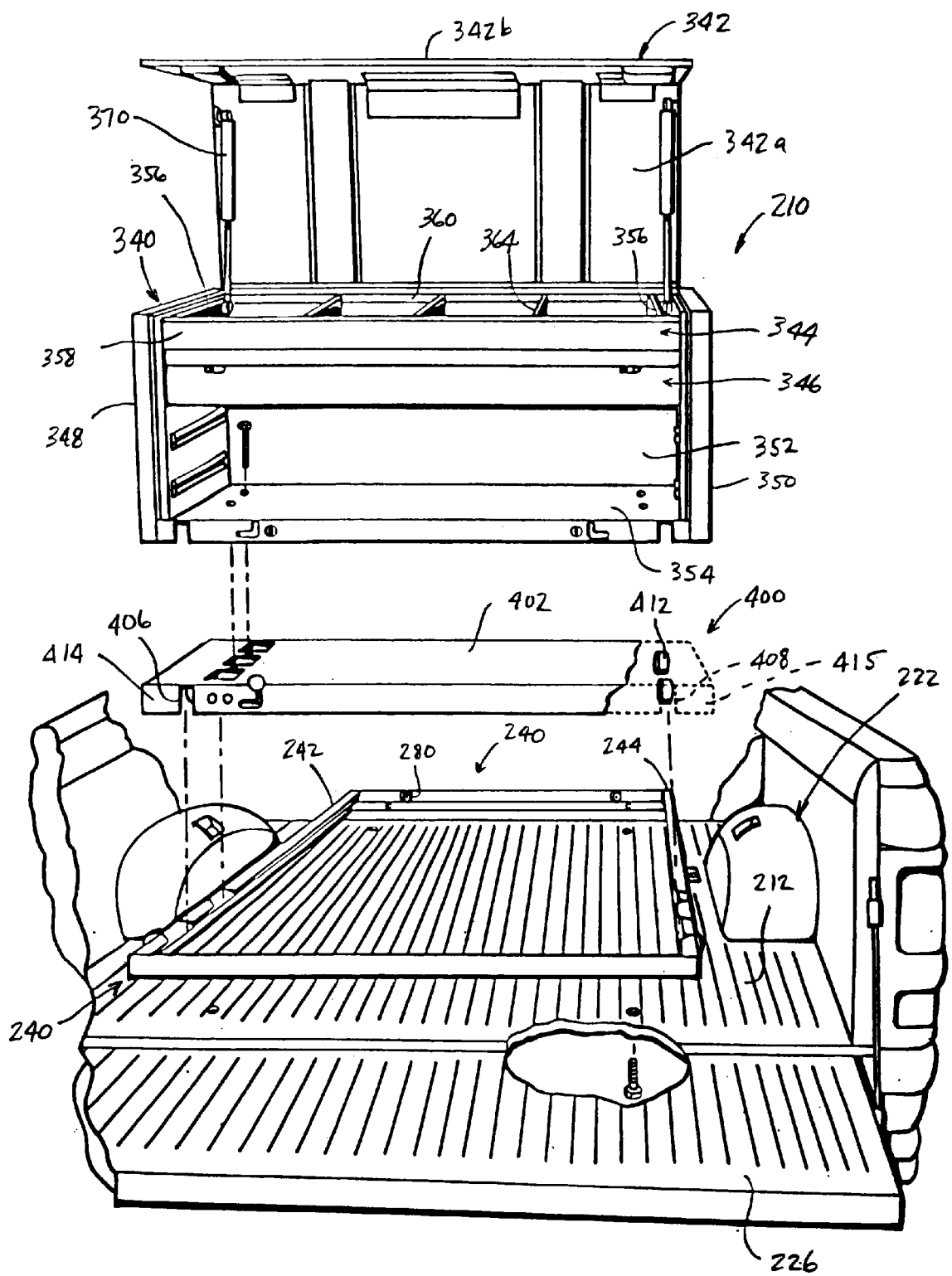
FIG. 17 is an exploded perspective view of the storage structure of FIG. 15.
Figure 18:
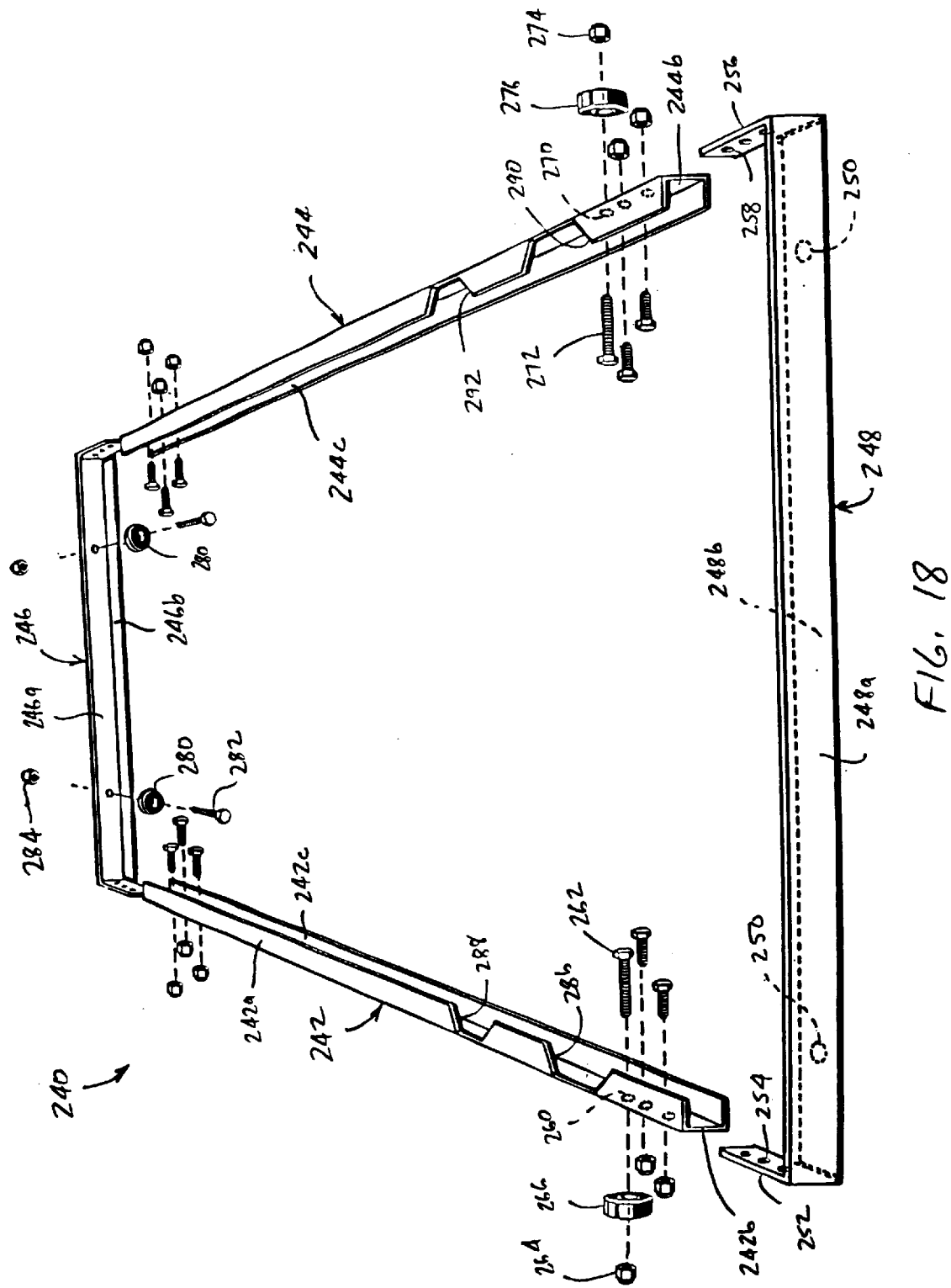
FIG. 18 illustrates a mounting structure for mounting the storage unit of FIG. 15 to the pickup truck.

The storage structure 200 may be provided with a mounting structure 240 that may be mounted to the rear bed 212 of the pickup truck 214 and which may slidably support the storage unit 210. As shown in FIGS. 15, 17 and 18, the mounting structure 240 may be rectangular or substantially rectangular in shape. Referring to FIG. 18, the mounting structure 240 may include a left guide member or rail 242, a right guide member or rail 244, a forward connecting piece or member 246, and a rear connecting piece or member 248. The terms "left," "right," "forward," and "rear" are used simply for ease of reference (when the mounting structure is viewed from the rear of the pickup truck 214) and are not used herein in a limiting sense to structurally define the components.

The guide members 242, 244 may be provided with a C-shaped cross section. The left guide member 242 may be provided with an upper wall 242a, a side wall 242b, and a lower wall 242c, and the right guide member 244 may be provided with an upper wall 244a, a side wall 244b, and a lower wall 244c. The forward connecting member 246 may be L-shaped in cross section and may have a side wall 246a and a bottom wall 246b. The rear connecting member 248 may be L-shaped in cross section and may have a side wall 248a and a bottom wall 248b. The mounting structure 240 may be permanently mounted to the rear bed 212 of the pickup truck 214 by a plurality of mounting means or devices, such as a plurality of bolts which may pass through a plurality of holes 250 formed in the mounting structure 240, such as in the bottom wall 248b of the rear connecting member 248 and the bottom wall 246b of the forward connecting member 246.

The rear connecting member 248 may be provided with a left connecting flange 252 having a plurality of connecting holes 254 formed therein and a right connecting flange 256 having a plurality of connecting holes 258 formed therein. A plurality of connecting holes 260 may be formed in the left guide member 242, and the left connecting flange 252 may be fastened to the left guide member 242 via a plurality of bolts 262 which pass through the holes 254, 260 and a plurality of nuts 264 that may be fastened onto the bolts 262. A cushioning member 266, such as a square or cylindrically shaped piece of rubber, may be fastened by one of the bolts 262 and nuts 264 to the outside face of the side wall 242b of the left guide member 242.

Similarly, a plurality of connecting holes 270 may be formed in the right guide member 244, and the right connecting flange 256 may be fastened to the right guide member 244 via a plurality of bolts 272 which pass through the holes 258, 270 and a plurality of nuts 274 that may be fastened onto the bolts 272. A cushioning member 276, such as a square or cylindrically shaped piece of rubber, may be fastened by one of the bolts 272 and nuts 274 to the outside face of the side wall 244b of the right guide member 244.

The forward connecting member 246 may be attached to the left and right guide members 242, 244 in the same or a similar manner as described above. One or more cushioning members 280 may be attached to an inner face of the vertical side wall 246a of the connecting member 246 via one or more bolts 282 and one or more nuts 284. A pair of apertures or slots 286, 288 may be formed in the upper wall 242a of the left guide member 242, and a pair of slots 290, 292 may be formed in the upper wall 242a of the right guide member 244.

The Storage Unit 210

The storage unit 210 may have the same or a similar structure to the storage unit 10 described above in connection with FIGS. 1–14.

Figure 16:
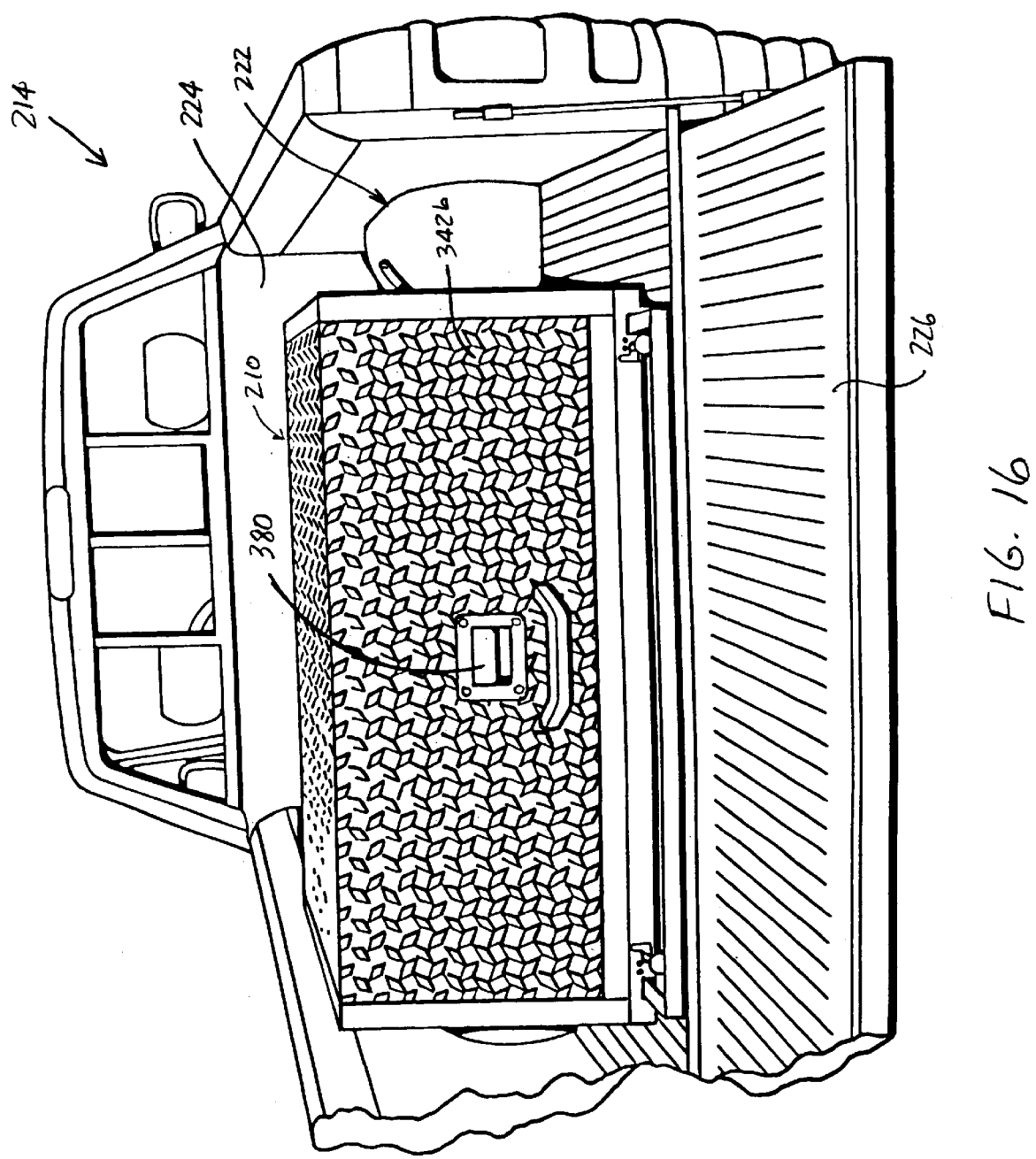
FIG. 16 illustrates the storage structure of FIG. 15 shown in a second position in the rear bed of the pickup truck.

The storage unit 210 may also have the structure shown in FIGS. 15–17 or a similar structure. Referring to FIGS. 16 and 17, the storage unit 210 may be provided with a box-shaped cabinet 340, a cover 342 pivotally connected to the cabinet 340, a non-slidable or fixed top tray 344, and one or more slidable drawers 346. The cabinet 340 may be provided with a first sidewall 348, a second sidewall 350, a rear cabinet member 352, such as a flat wall portion, and a cabinet floor member 354, such as a flat base portion. The cabinet 340, the cover 342 and other parts of the storage unit 210 may be composed of steel, and the cabinet 340 and the cover 342 may be provided with a patterned surface having diamond-shaped raised areas for strength and/or durability.

Referring to FIG. 17, the top tray 344 may be provided with a pair of tray sidewalls 356 spaced apart by a distance ranging from about 30 inches to about 48 inches. The top tray 344 may be provided with a front wall 358 and a rear wall 360. The tray walls 356, 358, 360 may have a plurality of spaced-apart slots formed therein, with each of the slots sized to receive one end of a tray divider 364. The tray dividers 364 may have slots formed therein to facilitate division of the top tray 344 into various sized rectangular storage areas via tray dividers 364 oriented in a direction parallel to the length of the cabinet 340 and tray dividers 364 oriented in a direction perpendicular to the length of the cabinet 340.

The size and structure of each of the drawers 346 of the storage unit 210 could be the same or similar to the drawer structure described above in connection with FIGS. 3, 7 and 8. Each of the drawers 346 could include one or more latch assemblies identical or similar to the ones described above in connection with FIGS. 3, 9 and/or 10.

Referring to FIG. 17, the cover 342 may be provided as an L-shaped member having a top cover portion 342a and a front cover portion 342b disposed perpendicular to the top cover portion 342a. Opening and closing the cover 342 may be assisted by one or more support assemblies 370, which may be the same in structure and operation as the assemblies 110 described above in connection with FIG. 12.

Referring to FIG. 16, the front cover portion 342b may have one or more opening latches 380 formed therein. The opening latches 380 may have the same or a similar structure as the latches 130 shown in FIG. 13 and described above.

Base Structure 400

The storage unit 210 may be provided with a base structure 400 that may be used either to slidably mount the storage unit 210 on the mounting structure 240 fixed to the rear bed 212 of the pickup truck 214 or to permanently mount the storage unit 210 directly to the rear bed 212 of the pickup truck 214 without utilizing the mounting structure 240.

Figure 19:
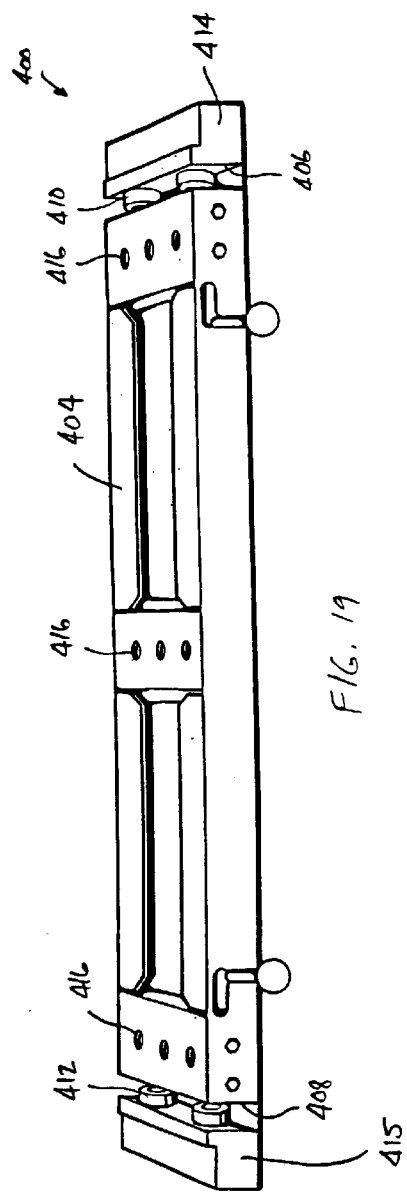
FIG. 19 illustrates the underside of a base structure that may be incorporated in the storage unit.

One possible embodiment of the base structure 400 is shown in FIGS. 17 and 19. FIG. 17 is a perspective view of the top of the base structure 400, and FIG. 19 is a perspective view of the bottom of the base structure 400. Referring to FIGS. 17 and 19, the base structure 400 may be provided with an upper side 402 and a lower side 404 that is intended to face downwardly towards the rear bed 212 of the pickup truck 214.

A pair of guide channels 406, 408 may be formed in the base structure 400. Each of the guide channels 406, 408 may be provided with a width and depth that are large enough to allow a respective one of the guide members 242, 244 to be slidably disposed therein. One or more slide-enabling structures, such as wheels 410, 412, may be disposed in each of the guide channels 406, 408 to facilitate sliding movement of the base structure 400 relative to the mounting structure 240. If wheels are used, the wheels may be provided with sealed bearings. The wheels 410, 412 may be mounted to one of the side walls of the guide channels 406, 408 in any manner, such as by a plurality of bolts and nuts.

Each of the wheels 410, 412 may be sized so that each may pass through a respective one of the slots 286, 288, 290, 292 formed in the guide members 242, 244. If more than one wheel is disposed in each of the guide channels 406, 408, the wheels 410, 412 in each of the guide channels 406, 408 may be spaced apart by a distance corresponding to the distance between the slots 286, 288 and the distance between the slots 290, 292 so that when the base structure 400 is placed over the mounting structure 240, each of the wheels 410, 412 may simultaneously pass through a respective one of the slots 286, 288, 290, 292.

When the base structure 400 is mounted or disposed over or on top of the mounting structure 240, each of the wheels 410, 412 may roll along one of the bottom walls 242c, 244c of the mounting structure 240 and thereby facilitate sliding of the base structure 400 relative to the mounting structure 240.

The base unit 400 may be provided with a first end portion 414 and a second end portion 415. The end portions 414, 415 may be formed so that each is disposed outside of or extends beyond a respective one of the guide members 242, 244. When the end portions 414, 415 are so formed and when the base structure 400 is mounted or positioned over the mounting structure 240, the end portions 414, 415 may make physical contact with the cushioning members 266, 276 (FIG. 18) mounted to the outside surfaces of the guide members 242, 244 in order to define a first end of the range of sliding motion of the base structure 400 relative to the mounting structure 240. The other end of the range of sliding motion of the base structure 400 may be defined by physical contact between the cushioning members 280 and a rear wall of the base structure 400.

The base structure 400, which may be considered to be part of the storage unit 210, may be mounted to the cabinet floor member 354 of the storage unit 210. Such mounting may be accomplished, for example, by a plurality of bolts and nuts. The lower side 404 of the base structure 400 may be provided with a plurality of holes 416 to allow the base structure 400 to be mounted directly to the bed 212 of the pickup truck 214, such as by a plurality of bolts and nuts, without utilizing the mounting structure 240. In that case, the base structure 400 would be fixed to the rear bed 212 and would not slide.

Latching Mechanism

Figure 20:
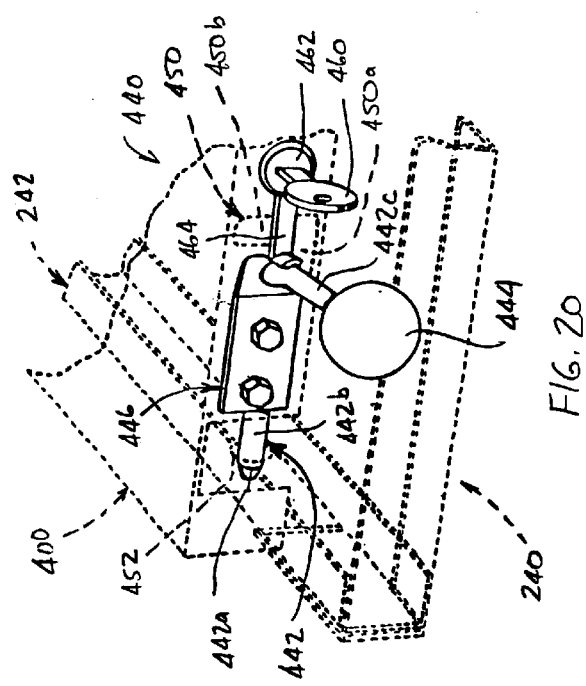
FIG. 20 is a perspective view, shown partly in phantom, of an embodiment of a latching mechanism.

FIG. 20 illustrates one possible embodiment of a latching mechanism 440 that may be used to latch the base structure 400 of the storage unit 210 to prevent the storage unit 210 from sliding relative to the mounting structure 240. Referring to FIG. 20, the latching mechanism 440 may include a latching member or rod 442, which may be L-shaped, a latch actuator or handle 444, and a latch mount structure 446 that slidably mounts the latching rod 442.

The latching rod 442 may be provided with an end 442a, a main rod portion 442b, and a third rod portion 442c. The third rod portion 442c may pass through a slot 450 formed in a portion of the base structure 400. The slot 450 may be L-shaped and may have a main slot portion 450a and a vertically disposed slot portion 450b. The guide member 242 may be provided with a latch hole 452.

The latching mechanism 440 may include a locking mechanism, which may include a key 460, a lock 462, and a locking arm 464. The locking arm 464 may be rotatable, upon insertion of the key 460 in the lock 462, from a first position shown in FIG. 20 where an end of the locking arm 464 prevents any sliding of the latching rod 442 and thus maintains the end 442a of the latching rod 442 in the latching hole 452 and a second position (not shown) in which the locking arm 464 may occupy a vertical position in which case the locking arm 464 does not contact the latching rod 442 and does not prevent sliding movement of the latching rod 442. It should be appreciated that the locking mechanism, if used, allows the storage unit 210 to be locked to the mounting structure 240 to prevent or hinder theft of the storage unit 210.

Figure 21:
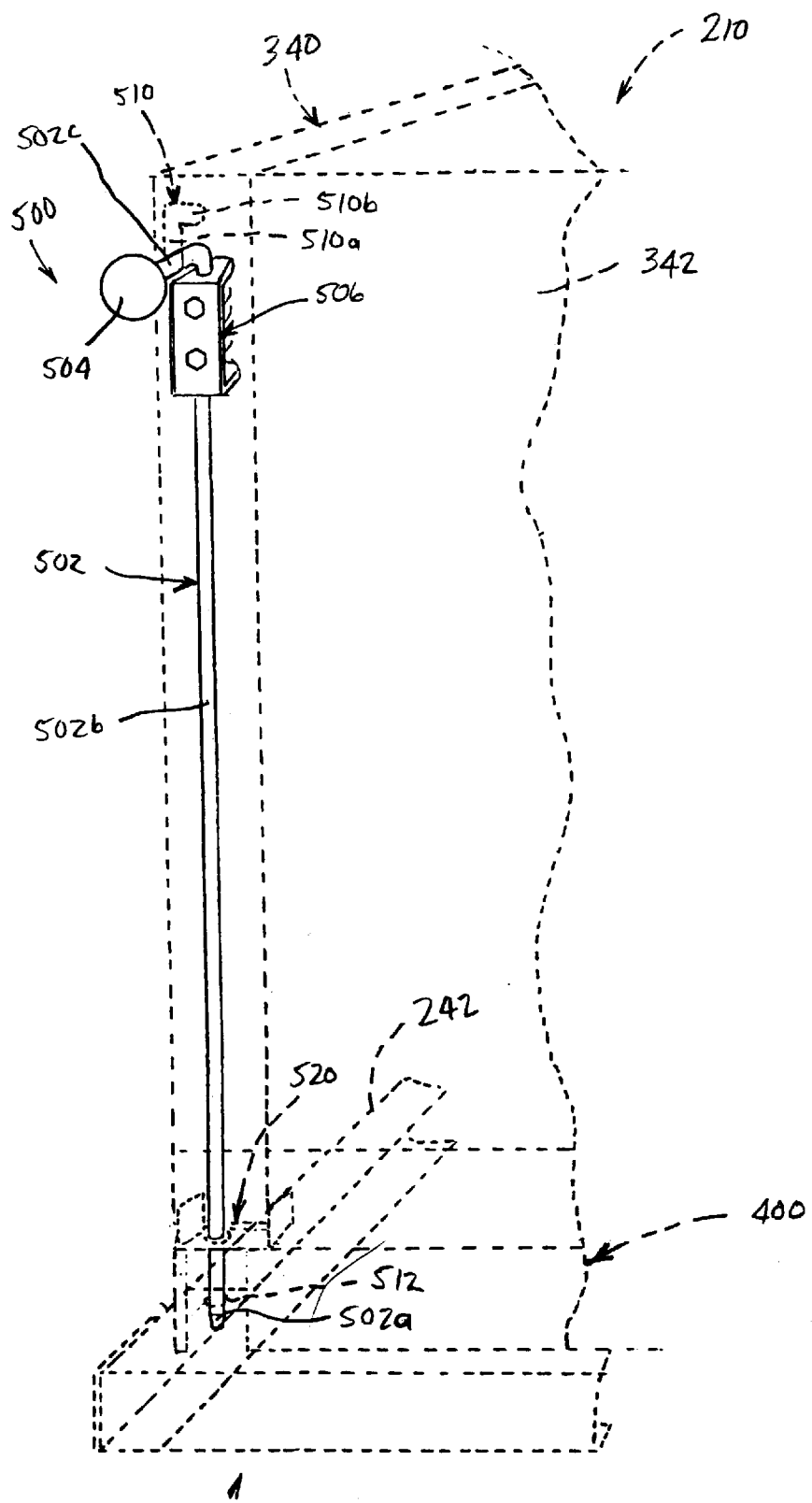
FIG. 21 is a perspective view, shown partly in phantom, of another embodiment of a latching mechanism.

FIG. 21 illustrates another possible embodiment of a latching mechanism 500 that may be used to latch the storage unit 210 to prevent the storage unit 210 from sliding relative to the mounting structure 240. Referring to FIG. 21, the latching mechanism 500 may include a latching member or rod 502, which may be L-shaped, a latch actuator or handle 504, and a latch mount structure 506 that slidably mounts the latching rod 502.

The latching rod 502 may be provided with an end 502a, a main rod portion 502b, and a third rod portion 502c. The third rod portion 502c may pass through a slot 510 formed in a portion of the cabinet 340. The slot 510 may be L-shaped and may have a main slot portion 510a and a horizontally disposed slot portion 510b. A spring may be provided to spring-bias the latching rod 502. The guide member 242 may be provided with a latch hole 512.

Where the main rod portion 502b is relatively long, a guide plate 520 having a guide hole formed therein may be used to maintain the registration or positioning of the lower end of the latch rod 502 with the latch hole 512. The guide plate 520 may be C-shaped, in which case it may include a pair of side plates which may facilitate mounting of the guide plate 520 to the storage unit 210. The latching mechanism 500 may include a locking mechanism, which may be the same or similar to the locking mechanism described above in connection with FIG. 20.

Installation and Operation

The storage structure 200 described above may be commercially marketed as a kit of components including the storage unit 210, the base structure 400, and the mounting structure 240. After purchasing the kit, a purchaser could install the components included in the kit to provide either a fixed, non-movable storage unit or a sliding storage unit.

If the purchaser desires a fixed, non-movable storage unit, the storage unit 210 may be installed to the rear bed 212 of the pickup truck 214 by mounting the cabinet 340 to the base structure 400, and mounting the base structure 400 directly to the rear bed 212, with bolts and nuts, for example. In this case, the mounting structure 240 would not be utilized by the purchaser.

If the purchaser desires a sliding storage unit, the storage structure 200 may be installed by mounting the mounting structure 240 to the rear bed 212 of the pickup truck, as shown for example in FIGS. 16 and 17. The purchaser may also mount the cabinet 340 to the base structure 400.

After the cabinet 340 is mounted to the base structure 400, the storage unit 210 may be mounted to or slidably disposed over the mounting structure 240 by first aligning the wheels 410, 412 of the base structure 400 with the slots 286, 288, 290, 292 formed in the mounting structure 240, and then lowering the storage unit 210 so that the wheels 410, 412 are rollingly captured between the upper walls 242a, 244a and the lower walls 242c, 244c of the mounting structure 240. When the wheels 410, 412 are so captured, the storage unit 210 may be rolled or slid between a first position in which the cabinet 340 is disposed adjacent the rearwardly facing cab wall 24 and a second position in which the cabinet 340 is disposed adjacent the rear door 226 of the pickup truck or vehicle 214.

When the term "adjacent" is used in connection with the above-described embodiments of the invention, a component or structure may be considered to be "adjacent" another component or structure if the two components or structures are: 1) right next to each other; 2) disposed within a distance of about four inches from each other; 3) disposed within a distance of about six inches from each other; 4) disposed within a distance of about eight inches from each other; or 5) disposed within a distance of about one foot from each other.

Numerous additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A vehicle mounted storage structure mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, and a rear door, said vehicle mounted storage structure comprising:

a mounting structure mounted to said rear floor portion of said vehicle, said mounting structure comprising:
  a first guide member mounted to said rear floor portion of said vehicle, said first guide member being mounted in a direction substantially parallel to said first vehicle sidewall; and
  a second guide member mounted to said rear floor portion of said vehicle, said second guide member being mounted in a direction substantially parallel to said second vehicle sidewall and substantially parallel to said first guide member;

a cabinet slidably coupled to said mounting structure, said mounting structure allowing said cabinet to slide between a first position in which said cabinet is disposed adjacent said rearwardly facing cab wall and a second position in which said cabinet is disposed adjacent said rear door of said vehicle, said cabinet having a length of at least about three feet, a width of at least about twelve inches, and a height of at least about fifteen inches, said cabinet comprising:
  a first cabinet sidewall that is spaced from said first vehicle sidewall by at least about four inches in a direction perpendicular to said first cabinet sidewall;
  a second cabinet sidewall spaced from said first cabinet sidewall by at least about three feet in a direction parallel to said length of cabinet, said second cabinet sidewall being spaced from said second vehicle sidewall by at least about four inches in a direction perpendicular to said second cabinet sidewall;
  a rear cabinet member connected to said first and second cabinet sidewalls; and
  a cabinet floor member connected to said first and second cabinet sidewalls;

a first drawer disposed in said cabinet, said first drawer being positioned within said cabinet between said first cabinet side wall and said second cabinet sidewall, said first drawer being movable in a direction parallel to said width of said cabinet, said first drawer comprising:
  a first drawer sidewall;
  a second drawer sidewall spaced from said first drawer sidewall of said first drawer by at least about two feet in a direction parallel to said length of said cabinet; and
  a front drawer wall connected to said first and second drawer sidewalls of said first drawer, said front drawer wall of said first drawer having a first side that is spaced from said first sidewall of said vehicle by at least about eight inches and a second side that is spaced from said second sidewall of said vehicle by at least about eight inches;

at least one first drawer support member that supports said first drawer, said first drawer support member supporting said first drawer so that said first drawer is movable in a direction parallel to said width of said cabinet between an open position and a closed position;

a first drawer latch associated with said first drawer, said first drawer latch being movable between a first position in which said first drawer latch prevents said first drawer from being opened and a second position in which said first drawer latch allows said first drawer to be opened;

a second drawer disposed in said cabinet and positioned below said first drawer, said second drawer being positioned within said cabinet between said first cabinet side wall and said second cabinet sidewall, said second drawer being movable in a direction parallel to said width of said cabinet, said second drawer comprising:
a first drawer sidewall;
a second drawer sidewall spaced from said first drawer sidewall of said second drawer by at least about two feet in a direction parallel to said length of said cabinet; and
a front drawer wall connected to said first and second drawer sidewalls of said second drawer, said front drawer wall of said second drawer having a first side that is spaced from said first sidewall of said vehicle by at least about eight inches and a second side that is spaced from said second sidewall of said vehicle by at least about eight inches;

at least one second drawer support member that supports said second drawer, said second drawer support member supporting said second drawer so that said second drawer is movable in a direction parallel to said width of said cabinet between an open position and a closed position;

a second drawer latch associated with said second drawer, said second drawer latch being movable between a first position in which said second drawer latch prevents said second drawer from being opened and a second position in which said second drawer latch allows said second drawer to be opened;

a cover operatively connected to said cabinet, said cover comprising a first cover portion and a second cover portion that is perpendicular to said first cover portion, said cover being movable between an open position in which said first and second drawers may be opened and a closed position in which said cover prevents said first and second drawers from being opened; and a cover latch associated with said cover, said cover latch allowing said cover to be latched in its closed position.

2. A vehicle mounted storage structure as recited in claim 1 wherein said rear cabinet member comprises a rear cabinet wall.

3. A vehicle mounted storage structure as recited in claim 1 wherein said first distance is substantially equal to said second distance.

4. A vehicle mounted storage structure as recited in claim 1 wherein each of said first and second drawer latches comprises:
a movable latching member; and
a spring operatively coupled to said latching member that biases said latching member in a latching position in which one of said drawers is prevented from being opened.

5. A vehicle mounted storage structure as recited in claim 1 additionally comprising a pair of cover support assemblies that cause said cover to be retained in its open position.

6. A vehicle mounted storage structure as recited in claim 1 wherein said rear door of said vehicle comprises a tailgate.

7. A vehicle mounted storage structure as recited in claim 1 wherein said first and second guide members of said mounting structure extend for substantially the entire length of said rear floor portion of said vehicle.

8. A vehicle mounted storage structure mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, and a rear door, said vehicle mounted storage structure comprising:

a mounting structure mounted to said rear floor portion of said vehicle, said mounting structure comprising:
a first guide member mounted to said rear floor portion of said vehicle, said first guide member being mounted in a direction substantially parallel to said first vehicle sidewall; and
a second guide member mounted to said rear floor portion of said vehicle, said second guide member being mounted in a direction substantially parallel to said second vehicle sidewall and substantially parallel to said first guide member;

a cabinet slidably coupled to said mounting structure, said mounting structure allowing said cabinet to slide between a first position in which said cabinet is disposed adjacent said rearwardly facing cab wall and a second position in which said cabinet is disposed adjacent said rear door of said vehicle, said cabinet having a length of at least about three feet, a width of at least about twelve inches, and a height of at least about fifteen inches, said cabinet comprising:
a first cabinet sidewall that is spaced from said first vehicle sidewall by at least about four inches in a direction perpendicular to said first cabinet sidewall;
a second cabinet sidewall spaced from said first cabinet sidewall by at least about three feet in a direction parallel to said length of cabinet, said second cabinet sidewall being spaced from said second vehicle sidewall by at least about four inches in a direction perpendicular to said second cabinet sidewall;
a rear cabinet member connected to said first and second cabinet sidewalls; and
a cabinet floor member connected to said first and second cabinet sidewalls;

a first drawer disposed in said cabinet, said first drawer being positioned within said cabinet between said first cabinet side wall and said second cabinet sidewall, said first drawer being movable in a direction parallel to said width of said cabinet;

at least one first drawer support member that supports said first drawer, said first drawer support member supporting said first drawer so that said first drawer is movable in a direction parallel to said width of said cabinet between an open position and a closed position;

a first drawer latch associated with said first drawer, said first drawer latch being movable between a first position in which said first drawer latch prevents said first drawer from being opened and a second position in which said first drawer latch allows said first drawer to be opened;

a second drawer disposed in said cabinet and positioned below said first drawer, said second drawer being positioned within said cabinet between said first cabinet side wall and said second cabinet sidewall, said second drawer being movable in a direction parallel to said width of said cabinet;

at least one second drawer support member that supports said second drawer, said second drawer support member supporting said second drawer so that said second drawer is movable in a direction parallel to said width of said cabinet between an open position and a closed position; and a second drawer latch associated with said second drawer, said second drawer latch being movable between a first position in which said second drawer latch prevents said second drawer from being opened and a second position in which said second drawer latch allows said second drawer to be opened.

9. A vehicle mounted storage structure as recited in claim 8 wherein each of said first and second drawer latches comprises:

a movable latching member; and a spring operatively coupled to said latching member that biases said latching member in a latching position in which one of said drawers is prevented from being opened.

10. A vehicle mounted storage structure as recited in claim 8 wherein said rear door of said vehicle comprises a tailgate.

11. A vehicle mounted storage structure as recited in claim 8 wherein said first and second guide members of said mounting structure extend for substantially the entire length of said rear floor portion of said vehicle.

12. A vehicle mounted storage structure mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, and a rear door, said vehicle mounted storage structure comprising:

a mounting structure mounted to said rear floor portion of said vehicle, said mounting structure comprising:
a first guide structure mounted to said rear floor portion of said vehicle; and
a second guide structure mounted to said rear floor portion of said vehicle; and a cabinet slidably coupled to said mounting structure, said mounting structure allowing said cabinet to slide between a first position in which said cabinet is disposed adjacent said rearwardly facing cab wall and a second position in which said cabinet is disposed adjacent said rear door of said vehicle, said cabinet having a length of at least about three feet, said cabinet comprising:
a first cabinet sidewall that is spaced from said first vehicle sidewall by at least about four inches in a direction perpendicular to said first cabinet sidewall; and
a second cabinet sidewall spaced from said first cabinet sidewall by at least about three feet in a direction parallel to said length of cabinet, said second cabinet sidewall being spaced from said second vehicle sidewall by at least about four inches in a direction perpendicular to said second cabinet sidewall.

13. A vehicle mounted storage structure as recited in claim 12 wherein said rear door of said vehicle comprises a tailgate.

14. A vehicle mounted storage structure as recited in claim 12 wherein said first and second guide structures of said mounting structure extend for substantially the entire length of said rear floor portion of said vehicle.

15. A vehicle mounted storage structure mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, and a rear door, said vehicle mounted storage structure comprising:

a mounting structure mounted to said rear floor portion of said vehicle, said mounting structure comprising:
a first guide structure mounted to said rear floor portion of said vehicle;
a second guide structure mounted to said rear floor portion of said vehicle;

a cabinet slidably coupled to said mounting structure, said mounting structure allowing said cabinet to slide between a first position in which said cabinet is disposed adjacent said rearwardly facing cab wall and a second position in which said cabinet is disposed adjacent said rear door of said vehicle, said cabinet comprising:
a first cabinet sidewall that is spaced from said first vehicle sidewall by at least about four inches in a direction perpendicular to said first cabinet sidewall; and
a second cabinet sidewall spaced from said first cabinet sidewall by at least about three feet in a direction parallel to said length of cabinet, said second cabinet sidewall being spaced from said second vehicle sidewall by at least about four inches in a direction perpendicular to said second cabinet sidewall;

a first drawer disposed in said cabinet, said first drawer being positioned within said cabinet between said first cabinet side wall and said second cabinet sidewall, said first drawer being movable in a direction parallel to said width of said cabinet; and at least one first drawer support member that supports said first drawer, said first drawer support member supporting said first drawer so that said first drawer is movable in a direction parallel to said width of said cabinet between an open position and a closed position.

16. A vehicle mounted storage structure as recited in claim 15 wherein said rear door of said vehicle comprises a tailgate.

17. A vehicle mounted storage structure as recited in claim 15 wherein said first and second guide structures of said mounting structure extend for substantially the entire length of said rear floor portion of said vehicle.

18. A storage structure capable of being mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, and a rear door, said storage structure comprising:

a mounting structure capable of being mounted to said rear floor portion of said vehicle, said mounting structure comprising:
a first guide structure capable of being mounted to said rear floor portion of said vehicle;
a second guide structure capable of being mounted to said rear floor portion of said vehicle; and a cabinet capable of being slidably coupled to said mounting structure, said mounting structure allowing said cabinet to slide between a first position in which said cabinet is disposed adjacent said rearwardly facing cab wall and a second position in which said cabinet is disposed adjacent said rear door of said vehicle when said mounting structure is mounted to said vehicle and when said cabinet is mounted to said mounting structure, said cabinet comprising:
a first cabinet sidewall that is spaced from said first vehicle sidewall by at least about four inches in a direction perpendicular to said first cabinet sidewall when said mounting structure is mounted to said vehicle and when said cabinet is mounted to said mounting structure; and
a second cabinet sidewall spaced from said first cabinet sidewall in a direction parallel to said length of cabinet, said second cabinet sidewall being spaced from said second vehicle sidewall by at least about four inches in a direction perpendicular to said second cabinet sidewall when said mounting structure is mounted to said vehicle and when said cabinet is mounted to said mounting structure.

19. A storage structure as recited in claim 18 wherein said first and second guide members of said mounting structure having a length approximately equal to length of said rear floor portion of said vehicle.

20. A storage structure capable of being mounted to a rear floor portion of a vehicle having a rearwardly facing cab wall, a first vehicle sidewall, a first wheel well having a portion which extends outwardly from a portion of said first vehicle sidewall, a second vehicle sidewall, a second wheel well having a portion which extends outwardly from a portion of said second vehicle sidewall, and a rear door, said storage structure comprising:
a mounting structure capable of being mounted to said rear floor portion of said vehicle;
a cabinet capable of being slidably coupled to said mounting structure, said mounting structure allowing said cabinet to slide between a first position in which said cabinet is disposed adjacent said rearwardly facing cab wall and a second position in which said cabinet is disposed adjacent said rear door of said vehicle when said mounting structure is mounted to said vehicle and when said cabinet is mounted to said mounting structure, said mounting structure being designed to allow said cabinet to be removed from said mounting structure when said mounting structure is mounted to said vehicle,
said cabinet comprising:
a first cabinet sidewall that is spaced from said first vehicle sidewall by at least about four inches in a direction perpendicular to said first cabinet sidewall when said mounting structure is mounted to said vehicle and when said cabinet is mounted to said mounting structure; and
a second cabinet sidewall spaced from said first cabinet sidewall in a direction parallel to said length of cabinet, said second cabinet sidewall being spaced from said second vehicle sidewall by at least about four inches in a direction perpendicular to said second cabinet sidewall when said mounting structure is mounted to said vehicle and when said cabinet is mounted to said mounting structure.

21. A storage structure as recited in claim 20 wherein said first and second guide members of said mounting structure having a length approximately equal to length of said rear floor portion of said vehicle.

22. A storage structure as recited in claim 20 wherein said mounting structure has a plurality of slots, wherein said cabinet has a plurality of wheels, and wherein said cabinet may be removed from said mounting structure by aligning said slots in said mounting structure with said wheels and then lifting said cabinet.

* * * * *